United States Patent
Ahuja

(10) Patent No.: US 11,233,855 B2
(45) Date of Patent: Jan. 25, 2022

(54) SYSTEM FOR APPLICATION CONTROL USING DISTRIBUTED SERVERS

(71) Applicant: BANK OF AMERICA CORPORATION, Charlotte, NC (US)

(72) Inventor: Yogi Ahuja, Warwick, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/814,424

(22) Filed: Mar. 10, 2020

(65) Prior Publication Data

US 2021/0289033 A1    Sep. 16, 2021

(51) Int. Cl.
| | | |
|---|---|---|
| G06F 15/173 | (2006.01) | |
| H04L 29/08 | (2006.01) | |
| H04L 9/06 | (2006.01) | |
| G06F 15/177 | (2006.01) | |

(52) U.S. Cl.
CPC .......... *H04L 67/125* (2013.01); *H04L 9/0637* (2013.01); *H04L 67/34* (2013.01)

(58) Field of Classification Search
CPC ...... H04L 67/125; H04L 67/34; H04L 9/0637
USPC ................................................. 709/231, 224
See application file for complete search history.

(56) References Cited

U.S. PATENT DOCUMENTS

| | | |
|---|---|---|
| 9,749,140 B2 | 8/2017 | Oberhauser et al. |
| 10,268,528 B2 | 4/2019 | Furuichi et al. |
| 10,310,824 B2 | 6/2019 | Eksten et al. |
| 10,454,927 B2 | 10/2019 | Oberhauser et al. |
| 10,509,684 B2 | 12/2019 | Florissi et al. |
| 10,528,551 B2 | 1/2020 | Li et al. |
| 10,666,426 B2 | 5/2020 | Roets |
| 2017/0236120 A1 | 8/2017 | Herlihy et al. |
| 2017/0279818 A1* | 9/2017 | Milazzo ................ H04L 63/145 |
| 2018/0089256 A1 | 3/2018 | Wright, Sr. |
| 2018/0143995 A1 | 5/2018 | Bailey et al. |
| 2018/0285838 A1 | 10/2018 | Franaszek et al. |
| 2019/0050855 A1 | 2/2019 | Martino et al. |
| 2019/0050856 A1 | 2/2019 | Vintila |
| 2019/0081793 A1 | 3/2019 | Martino et al. |
| 2019/0116185 A1 | 4/2019 | Nagai et al. |
| 2019/0147190 A1 | 5/2019 | Marin |
| 2019/0158481 A1 | 5/2019 | Ronda et al. |
| 2019/0188941 A1 | 6/2019 | Campero et al. |
| 2019/0288858 A1 | 9/2019 | Chow et al. |
| 2019/0347627 A1 | 11/2019 | Lin et al. |
| 2019/0358515 A1 | 11/2019 | Tran et al. |

(Continued)

*Primary Examiner* — Karen C Tang
(74) *Attorney, Agent, or Firm* — Moore & Van Allen PLLC; Seongun M. Hong

(57) ABSTRACT

A system for application control using distributed servers is provided. In particular, the system may comprise a distributed computing network comprising one or more decentralized nodes. Each decentralized node may store a copy of a private distributed register comprising data records associated with one or more applications which may be subject to one or more rules. In this regard, each node may provide inputs to the private distributed register with respect to a certain data record, where each input may be given a unique weight based on the node submitting the input. The system may then run an algorithm to validate the inputs. In this way, the system may provide a secure way to perform management and control of applications used within the network environment.

20 Claims, 3 Drawing Sheets

(56) References Cited

U.S. PATENT DOCUMENTS

2020/0027089 A1\* 1/2020 Kuchar .............. G06F 16/1837
2020/0233917 A1\* 7/2020 Kurtanovic ............ G06F 9/547
2020/0296128 A1\* 9/2020 Wentz ................ H04L 63/1433

\* cited by examiner

SYSTEM FOR APPLICATION CONTROL USING DISTRIBUTED SERVERS

FIELD OF THE INVENTION

The present disclosure embraces a system for application control using distributed servers.

BACKGROUND

There is a need for an efficient and secure way to execute controls and reviews of applications.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for application control using distributed servers. In particular, the system may comprise a distributed computing network comprising one or more decentralized nodes. Each decentralized node may store a copy of a private distributed register comprising data records associated with one or more applications which may be subject to one or more rules. In this regard, each node may provide inputs to the private distributed register with respect to a certain data record, where each input may be given a unique weight based on the node submitting the input. The system may then run an algorithm to validate the inputs. In this way, the system may provide a secure way to perform management and control of applications used within the network environment.

Accordingly, embodiments of the present disclosure provide a system for application control using distributed servers. The system may comprise a memory device with computer-readable program code stored thereon; a communication device; and a processing device operatively coupled to the memory device and the communication device. The processing device may be configured to execute the computer-readable program code to determine that an application is associated with a first requirement; receive, from each of one or more nodes, input data associated with the first requirement; adjust a weight of the input data from a first node of the one or more nodes based on an identity of the first node; generate a composite score from an aggregate of the input data; execute an assessment of the composite score against a predefined threshold; and append a result of the assessment to a private distributed register.

In some embodiments, executing the assessment of the composite score against the predefined threshold comprises determining that the composite score meets or exceeds the predefined threshold; and determining that the application is compliant with the first requirement.

In some embodiments, executing the assessment of the composite score against the predefined threshold comprises determining that the composite score does not meet the predefined threshold; and determining that the application is not compliant with the first requirement.

In some embodiments, the computer-readable program code further causes the processing device to dynamically adjust the predefined threshold based on the first requirement.

In some embodiments, the computer-readable program code further causes the processing device to, based on determining that the application is associated with the first requirement, transmit one or more requests for the input data to the one or more nodes.

In some embodiments, generating the composite score comprises validating the input data using a proof of stake consensus algorithm.

In some embodiments, the assessment is saved as a document file within a data record within the private distributed register.

Embodiments of the present disclosure also provide a computer program product for application control using distributed servers. The computer program product may comprise at least one non-transitory computer readable medium having computer-readable program code portions embodied therein, the computer-readable program code portions comprising executable portions for determining that an application is associated with a first requirement; receiving, from each of one or more nodes, input data associated with the first requirement; adjusting a weight of the input data from a first node of the one or more nodes based on an identity of the first node; generating a composite score from an aggregate of the input data; executing an assessment of the composite score against a predefined threshold; and appending a result of the assessment to a private distributed register.

In some embodiments, executing the assessment of the composite score against the predefined threshold comprises determining that the composite score meets or exceeds the predefined threshold; and determining that the application is compliant with the first requirement.

In some embodiments, executing the assessment of the composite score against the predefined threshold comprises determining that the composite score does not meet the predefined threshold; and determining that the application is not compliant with the first requirement.

In some embodiments, the computer-readable program code portions further comprise executable portions for dynamically adjusting the predefined threshold based on the first requirement.

In some embodiments, the computer-readable program code portions further comprise executable portions for, based on determining that the application is associated with the first requirement, transmitting one or more requests for the input data to the one or more nodes In some embodiments, generating the composite score comprises validating the input data using a proof of stake consensus algorithm.

Embodiments of the present disclosure also provide a computer-implemented method for application control using distributed servers. The method may comprise determining that an application is associated with a first requirement; receiving, from each of one or more nodes, input data associated with the first requirement; adjusting a weight of the input data from a first node of the one or more nodes based on an identity of the first node; generating a composite score from an aggregate of the input data; executing an assessment of the composite score against a predefined threshold; and appending a result of the assessment to a private distributed register.

In some embodiments, executing the assessment of the composite score against the predefined threshold comprises determining that the composite score meets or exceeds the predefined threshold; and determining that the application is compliant with the first requirement.

In some embodiments, executing the assessment of the composite score against the predefined threshold comprises determining that the composite score does not meet the predefined threshold; and determining that the application is not compliant with the first requirement.

In some embodiments, the method further comprising dynamically adjusting the predefined threshold based on the first requirement.

In some embodiments, the method further comprising, based on determining that the application is associated with the first requirement, transmitting one or more requests for the input data to the one or more nodes.

In some embodiments, generating the composite score comprises validating the input data using a proof of stake consensus algorithm.

In some embodiments, the assessment is saved as a document file within a data record within the private distributed register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
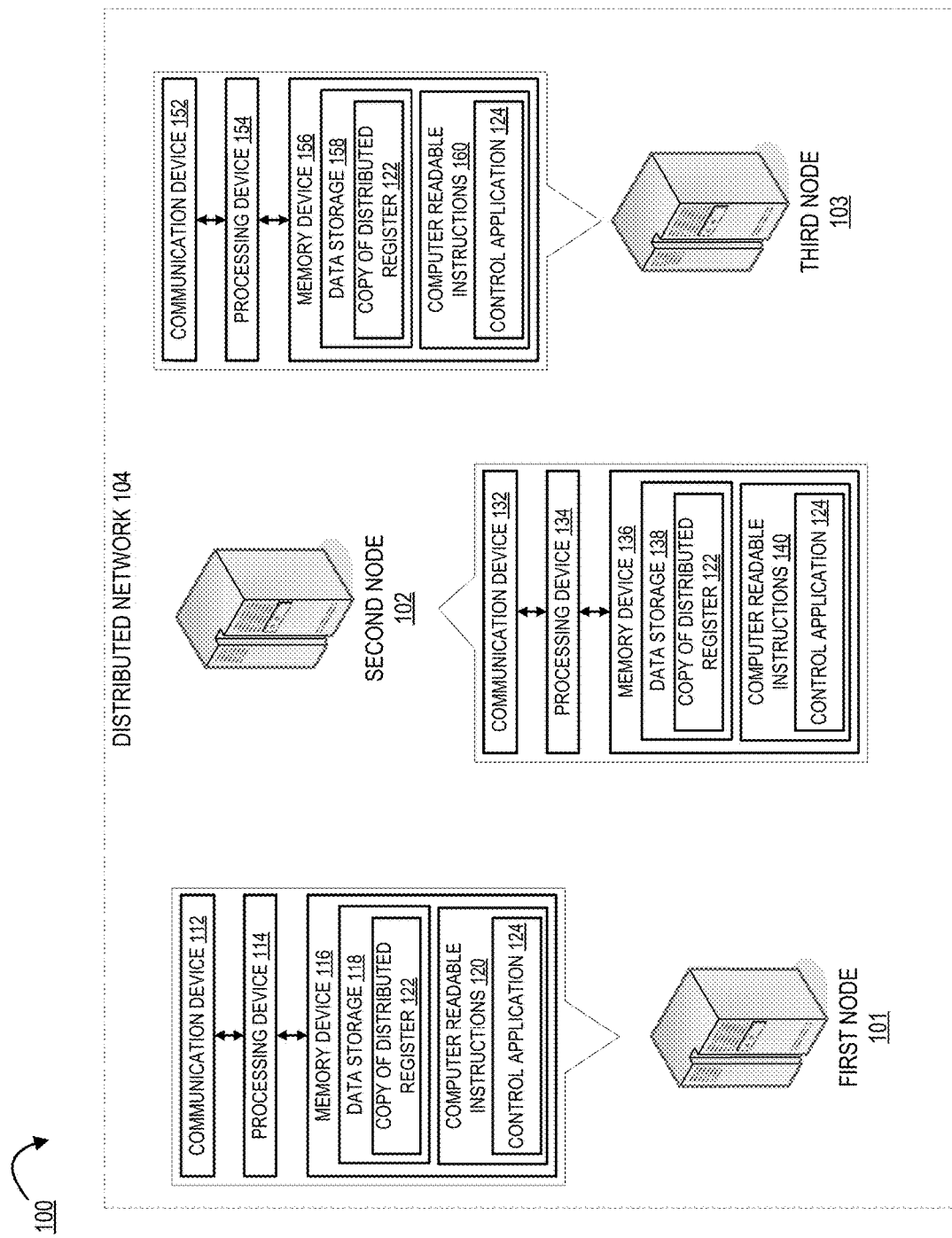
Figure 2:
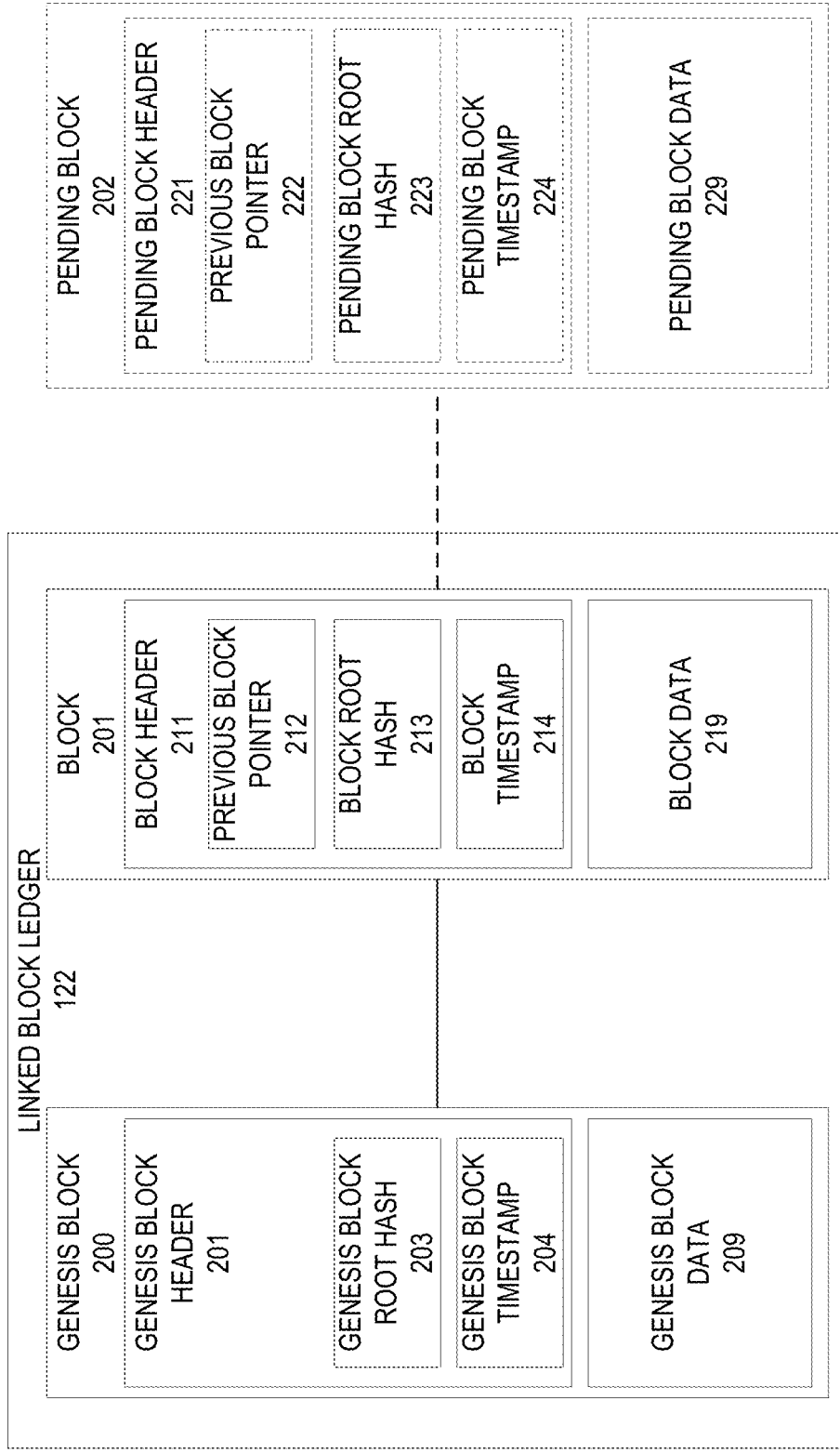
Figure 3:
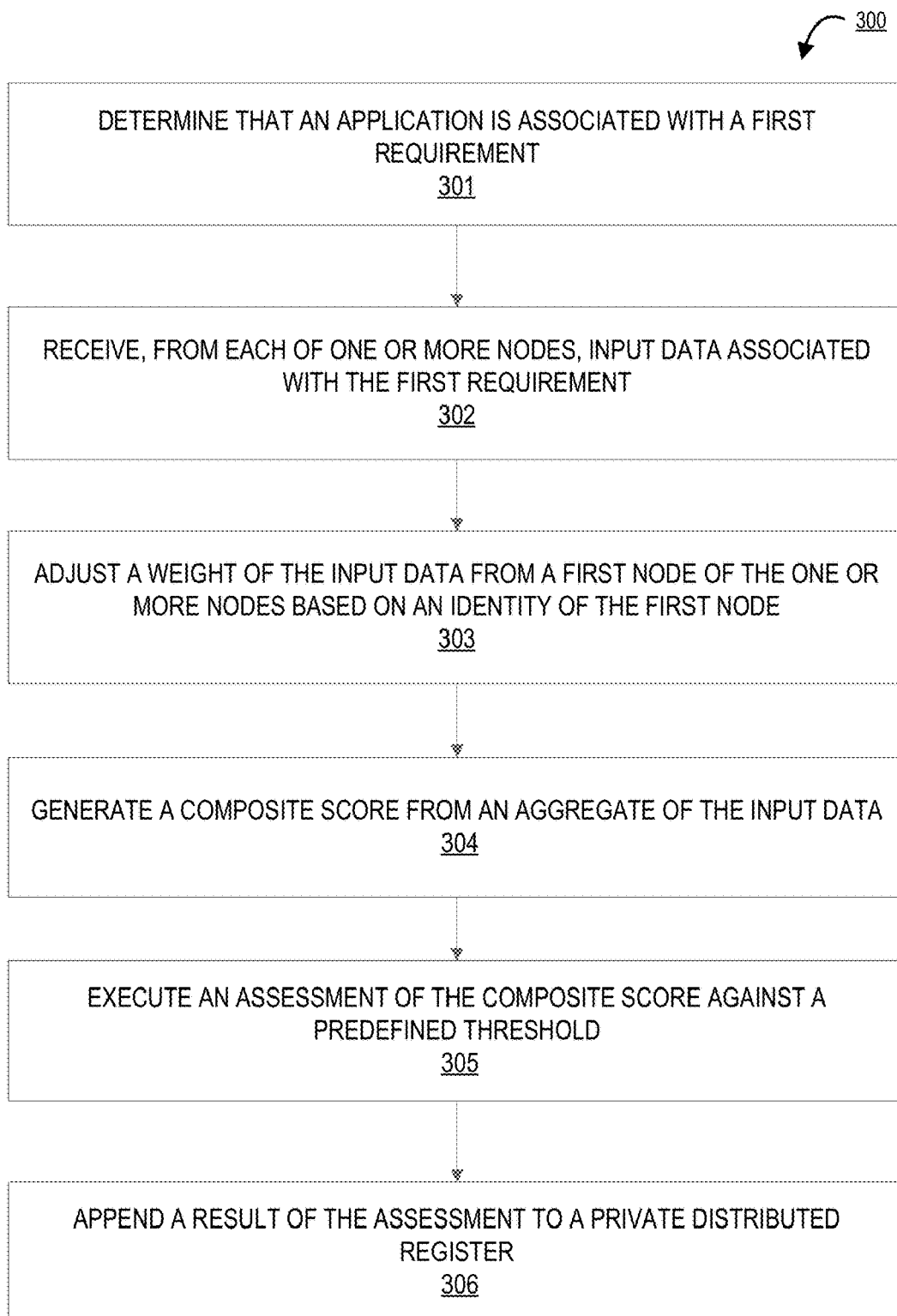

Having thus described embodiments of the invention in general terms, reference will now be made to the accompanying drawings, wherein:

FIG. 1 illustrates an operating environment for the application control distributed server system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process using the application control distributed server system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

In the application management context, the entity may store certain types of data associated with the applications (which may be referred to herein as "application data") used within the networked environment. For instance, the system may store data to be accessed and/or processed by the applications, application metadata, version histories, update information, or the like. In scenarios in which the networked environment includes a large number of applications (e.g., thousands of applications), application managers, who may be tasked with managing each application, may face challenges in processing the large amounts of data and/or metadata associated with each application.

Accordingly, the system as described herein may comprise a private distributed ledger hosted on multiple nodes, where each node hosts copies of the private distributed ledger. The private distributed ledger may comprise application data and/or metadata as described above. Each node may be operated by a person or entity having different roles with respect to any particular application. For example, with respect to a specific application, the application's developer, tester, analyst, manager, engineer, automated bot, or the like may serve as nodes, each of which hosts a copy of the private distributed ledger. Each of the nodes may then submit data with respect to the application with which they are associated. For instance, the system may require that the nodes input data in response to an action item concerning the application.

Once each of the nodes has inputted their data, the system may, based on the identity of the node, validate the data inputted by the nodes via a consensus algorithm. In this regard, certain nodes may be given more weight by the algorithm than others. For instance, with respect to a particular action item, a developer's input data may be given more weight than a tester's input data (e.g., the developer has a higher stake than the tester). In such embodiments, the consensus algorithm may be a Proof-of-Stake mechanism. If the system successfully validates the input data, the system may append a data record containing the results of the validation process to the private distributed ledger. In this way, the system may maintain an immutable, persistent log of records with respect to its applications.

An exemplary use case is provided as follows for illustrative purposes. In one embodiment, an application may be subject to one or more requirements, regulations, rules, laws, or policies regarding its functionality. For example, the application may be subject to requirements that it is not used to process confidential or personally identifiable information (PII). In other embodiments, the application may be required to have been patched with a critical security update. In such cases, the system may require that the individuals and/or entities associated with the application provide certifications that the application is compliant with such requirements. In this regard, the application developer, manager, systems engineer, AI engine, and the like, each of which may host a node, may access an application governance tool to submit an input (e.g., 0 or 1) to the private distributed ledger which may include a certification with respect to the application and/or the requirement. The system may then use a consensus algorithm (e.g., a Proof-of-Stake mechanism) to validate the inputs received from each of the nodes. In some embodiments, inputs received from certain nodes may be given more weight than inputs received from other nodes. For example, if the application is being assessed with respect to a critical security patch, an input from the system engineer may be given more weight than input received from a robotic engine, tester, or developer.

Based on the weighted inputs received from the nodes, the system may calculate a composite score which may range from 0 to 1 (e.g., the composite score is expressed as a percentage). If the composite score is above a certain threshold (e.g., 0.7 or 70%), the system may consider the application to be in compliance with the requirement. The system may then submit a data record to the private distributed ledger which may contain the results of the consensus (e.g., whether the application is compliant or non-compliant). In this way, the system may generate a resilient and secure log which serves as the source of truth with respect to the compliance of all applications in use within the network environment.

The system as described herein confers a number of technological advantages over conventional application control systems. For instance, by storing compliance information within the distributed ledger, the system may avoid the creation of invalid or inaccurate data which may lead to issues with system resources, performance, and/or security. Furthermore, the weighted consensus algorithm as described herein further increases the accuracy of the assessments of the applications used within the network environment.

Turning now to the figures, FIG. 1 illustrates an operating environment 100 for the application control system, in accordance with one embodiment of the present disclosure. In particular, FIG. 1 illustrates a first node 101, a second node 102, and a third node 103 within a distributed network 104, where each of the nodes 101, 102, 103 host a copy of a distributed register 122, as will be described in further detail below. The nodes 101, 102, 103 within the distributed network 104 may be communicatively coupled with one another such that the nodes may send data to and receive data from the other nodes within the distributed network 104. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though FIG. 1 depicts three nodes 101, 102, 103, the operating environment may comprise a fewer or greater number of nodes according to the implementation of the system described herein.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first node 101 may be a part of the distributed network 104. In this regard, the first node 101 may be, for example, a networked terminal, server, desktop computer, or the like, though it is within the scope of the disclosure for the first node 101 to be a portable device such as a cellular phone, smart phone, smart device, personal data assistant (PDA), laptop, or the like. The first node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of the distributed register 122. The distributed register (and the copy of the distributed register 122) may comprise a series of data records relevant to the objectives of an entity associated with the distributed network 104. For instance, the distributed register may comprise a series of data records which may contain data and/or metadata associated with one or more applications. In this regard, the computer-readable instructions 120 may have a control application 124 stored thereon, where the control application 124 may comprise an application governance tool through which the first node 101 may submit information regarding an application and/or a rule or requirement to which the application relates.

As further illustrated in FIG. 1, the second node 102 may also be a part of the distributed network 104 and comprise a communication device 132, a processing device 134, and a memory device 136. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 132, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The processing device 134 is operatively coupled to the communication device 132 and the memory device 136. The processing device 134 uses the communication device 132 to communicate with the network and other devices on the network, such as, but not limited to the first node 101 and/or the third node 103. The communication device 132 generally comprises a modem, antennae, WiFi or Ethernet adapter, radio transceiver, or other device for communicating with other devices on the network.

In some embodiments, the memory device 136 may further include data storage 138 which may comprise a copy of the distributed register 12. The memory device 136 may have computer-readable instructions 140 stored thereon, which may further comprise the control application 124.

As further illustrated in FIG. 1, the third node 103 may be a part of the distributed network 104 and comprise a processing device 154 operatively coupled to a communication device 152 and a memory device 156. The memory device 156 may comprise data storage 158 having a copy of the distributed register 122 stored thereon. The memory device 156 may further comprise computer readable instructions 160 of the control application 124.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the third node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary linked block ledger, in accordance with some embodiments. In particular, FIG. 2 depicts a plurality of blocks 200, 201 within the linked block ledger 122, in addition to a pending block 202 that has been submitted to be appended to the linked block ledger 122. The linked block ledger 122 may comprise a genesis block 200 that serves as the first block and origin for subsequent blocks in the linked block ledger 122. The genesis block 200, like all other blocks within the linked block ledger 122, comprise a block header 201 and block data 209. The genesis block data 209, or any other instances of block data within the linked block ledger 122 (or any other distributed ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the linked block ledger 122. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the linked block ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the linked block ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the linked block ledger 122. A pending block timestamp 224 may also be added to signify the time at which the pending block 202 is added to the linked block ledger 122.

In other embodiments, the consensus mechanism may be based on a total number of votes submitted by the nodes of the linked block ledger 122, e.g., a PBFT consensus mechanism. Once a threshold number of votes to validate the pending block 202 has been reached, the pending block 202 may be appended to the linked block ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a combination block and process flow 300 diagram for the application control system, in accordance with one embodiment of the present disclosure. The process begins at block 301, where the system determines that an application is associated with a first requirement. The first requirement may include various types of rules, regulations, laws, policies, or other types of requirements as may be designated by the entity and/or third parties. For instance, the first requirement may be a rule concerning the processing of confidential user data. In other embodiments, the first requirement may be an internal rule which requires applications to be updated with critical security patches. In this regard, the system may determine that an application that is subject to the first requirement needs to be evaluated or assessed with respect to the first requirement. In some embodiments, the system makes the determination based on reading a data record from a private distributed register which indicates that the application should be checked against the first requirement. For instance, when the first requirement is a newly enacted requirement concerning the application, a data record may be appended to the private distributed register indicating that an assessment of the application is required. The system may then transmit notifications to one or more nodes, where the notifications contain a request for input data.

The process continues to block 302, where the system receives, from each of one or more nodes, input data associated with the first requirement. The one or more nodes may be operated by those who are associated with the application in some capacity. For instance, the one or more nodes may be operated by the application developer, application manager, tester, automated bot, or the like. Accordingly, the input data submitted by each node may comprise information about the application with respect to the first requirement. Continuing the above example, if the first requirement involves a critical security patch, the input data may include a confirmation (e.g., yes or no) that the application has been updated with the critical security patch.

The process continues to block 303, where the system adjusts a weight of the input data from a first node of the one or more nodes based on an identity of the first node. In this regard, the system may give greater weight to input data received from certain nodes compared to other nodes. The greater weight may be assigned based on the node which may be most likely to have accurate information about the particular application and/or requirement. For instance, continuing the above example regarding a critical security patch, an engineer who applied the patch to the application may be more likely to know the state of the application than a tester. Accordingly, the input data received from the engineer's node may be assigned a greater weight than the input data received from the tester's node.

The process continues to block 304, where the system generates a composite score from an aggregate of the input data. The composite score may range from 0 to 1 based on the input data received from each node. In this regard, the composite score may be calculated as an average of the input data received, taking into account the weights of the input data received from each node. Continuing the above example, the composite score may reflect the system's degree of confidence that the application has been updated using the required security patches. In this way, the system may generate confidence scores for each requirement that applies to each application in use within the networked environment.

The process continues to block 305, where the system executes an assessment of the composite score against a predefined threshold. The system may designate a threshold (e.g., a minimum confidence level) that must be met or exceeded in order to determine that an application satisfies the requirement. In some embodiments, the predefined threshold may be expressed as a value between 0 and 1 (e.g., a percentage), such as 0.7 (or 70%). If the composite score calculated above meets or exceeds the predefined threshold, then the system may determine that the application satisfies the requirement. If the composite score does not meet the predefined threshold, the system may determine that the application does not satisfy the requirement and that further action steps must be taken to remedy the noncompliant application. In some embodiments, the system may dynamically adjust the predefined threshold based on the type of requirement and/or application to be assessed. For instance, requirements that are especially critical or sensitive may be assigned a higher required threshold, while requirements that are less critical may be assigned a lower required threshold.

The process concludes at block 306, where the system appends a result of the assessment to a private distributed register. Accordingly, if the system determines that the application satisfies the requirement, the system may append a data record to the private distributed register which contains information regarding such a determination (e.g., as a document file). Subsequently, the data record may be read by the nodes and/or other computing systems within the network for verification and/or auditing purposes. Conversely, if the data record indicates that the application is not compliant with respect to the requirement, the auditing entities may subsequently resolve the issue with the noncompliant application (e.g., by applying the security patch). In this way, the system may provide a reliable and accurate source of information regarding the status of the applications in use within the networked environment.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for application control using distributed servers, the system comprising:

a memory device with computer-readable program code stored thereon;

a communication device; and a processing device operatively coupled to the memory device and the communication device, wherein the processing device is configured to execute the computer-readable program code to:

determine that an application is associated with a first requirement;

receive, from each of one or more nodes, input data associated with the first requirement, wherein each of the one or more nodes is associated with one or more roles associated with the application;

adjust a weight of the input data from a first node of the one or more nodes based on an identity of the first node, the first requirement, and the one or more roles associated with the application of the first node, wherein the one or more roles associated with the application of the first node comprises a developer role;

adjust a weight of the input data from a second node of the one or more nodes based on an identity of the second node, the first requirement, and the one or more roles associated with the application of the second node, wherein the one or more roles associated with the application of the second node comprises a system engineer role, wherein adjusting the weight of the input data from the second node comprises:
  detecting, based on the system engineer role, that the second node is more likely to have accurate information about the application and the first requirement; and
  increasing the weight of the input data from the second node in comparison to the weight of the input data from the first node;
generate a composite score from an aggregate of the input data;
execute an assessment of the composite score against a predefined threshold; and
append a result of the assessment to a private distributed register.

2. The system according to claim 1, wherein executing the assessment of the composite score against the predefined threshold comprises:
  determining that the composite score meets or exceeds the predefined threshold; and
  determining that the application is compliant with the first requirement.

3. The system according to claim 1, wherein executing the assessment of the composite score against the predefined threshold comprises:
  determining that the composite score does not meet the predefined threshold; and
  determining that the application is not compliant with the first requirement.

4. The system according to claim 1, wherein the computer-readable program code further causes the processing device to dynamically adjust the predefined threshold based on the first requirement.

5. The system according to claim 1, wherein the computer-readable program code further causes the processing device to, based on determining that the application is associated with the first requirement, transmit one or more requests for the input data to the one or more nodes.

6. The system according to claim 1, wherein generating the composite score comprises validating the input data using a proof of stake consensus algorithm.

7. The system according to claim 1, wherein the assessment is saved as a document file within a data record within the private distributed register.

8. A computer program product for application control using distributed servers, the computer program product comprising at least one non-transitory computer readable medium having computer-readable program code portions embodied therein, the computer-readable program code portions comprising executable portions for:
  determining that an application is associated with a first requirement;
  receiving, from each of one or more nodes, input data associated with the first requirement, wherein each of the one or more nodes is associated with one or more roles associated with the application;
  adjusting a weight of the input data from a first node of the one or more nodes based on an identity of the first node, the first requirement, and the one or more roles associated with the application of the first node, wherein the one or more roles associated with the application of the first node comprises a developer role;
  adjusting a weight of the input data from a second node of the one or more nodes based on an identity of the second node, the first requirement, and the one or more roles associated with the application of the second node, wherein the one or more roles associated with the application of the second node comprises a system engineer role,
  wherein adjusting the weight of the input data from the second node comprises:
    detecting, based on the system engineer role, that the second node is more likely to have accurate information about the application and the first requirement; and
    increasing the weight of the input data from the second node in comparison to the weight of the input data from the first node;
  generating a composite score from an aggregate of the input data;
  executing an assessment of the composite score against a predefined threshold; and
  appending a result of the assessment to a private distributed register.

9. The computer program product of claim 8, wherein executing the assessment of the composite score against the predefined threshold comprises:
  determining that the composite score meets or exceeds the predefined threshold; and
  determining that the application is compliant with the first requirement.

10. The computer program product of claim 8, wherein executing the assessment of the composite score against the predefined threshold comprises:
  determining that the composite score does not meet the predefined threshold; and
  determining that the application is not compliant with the first requirement.

11. The computer program product of claim 8, the computer-readable program code portions further comprising executable portions for dynamically adjusting the predefined threshold based on the first requirement.

12. The computer program product of claim 8, the computer-readable program code portions further comprising executable portions for, based on determining that the application is associated with the first requirement, transmitting one or more requests for the input data to the one or more nodes.

13. The computer program product of claim 8, wherein generating the composite score comprises validating the input data using a proof of stake consensus algorithm.

14. A computer-implemented method for application control using distributed servers, the method comprising:
  determining that an application is associated with a first requirement;
  receiving, from each of one or more nodes, input data associated with the first requirement, wherein each of the one or more nodes is associated with one or more roles associated with the application;
  adjusting a weight of the input data from a first node of the one or more nodes based on an identity of the first node, the first requirement, and the one or more roles associated with the application of the first node, wherein the one or more roles associated with the application of the first node comprises a developer role;
  adjusting a weight of the input data from a second node of the one or more nodes based on an identity of the second node, the first requirement, and the one or more roles associated with the application of the second node, wherein the one or more roles associated with the application of the second node comprises a system engineer role, wherein adjusting the weight of the input data from the second node comprises:
  detecting, based on the system engineer role, that the second node is more likely to have accurate information about the application and the first requirement; and
  increasing the weight of the input data from the second node in comparison to the weight of the input data from the first node;
generating a composite score from an aggregate of the input data;
executing an assessment of the composite score against a predefined threshold; and
appending a result of the assessment to a private distributed register.

15. The computer-implemented method of claim 14, wherein executing the assessment of the composite score against the predefined threshold comprises:
  determining that the composite score meets or exceeds the predefined threshold; and
  determining that the application is compliant with the first requirement.

16. The computer-implemented method of claim 14, wherein executing the assessment of the composite score against the predefined threshold comprises:
  determining that the composite score does not meet the predefined threshold; and
  determining that the application is not compliant with the first requirement.

17. The computer-implemented method of claim 14, the method further comprising dynamically adjusting the predefined threshold based on the first requirement.

18. The computer-implemented method of claim 14, the method further comprising, based on determining that the application is associated with the first requirement, transmitting one or more requests for the input data to the one or more nodes.

19. The computer-implemented method of claim 14, wherein generating the composite score comprises validating the input data using a proof of stake consensus algorithm.

20. The computer-implemented method of claim 14, wherein the assessment is saved as a document file within a data record within the private distributed register.

* * * * *